United States Patent
Lang

(10) Patent No.: US 6,247,721 B1
(45) Date of Patent: Jun. 19, 2001

(54) GAS BAG MODULE AND METHOD OF ASSEMBLY THEREOF

(75) Inventor: Norbert Lang, Leinzell (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/354,655

(22) Filed: Jul. 16, 1999

(30) Foreign Application Priority Data

Jul. 17, 1998 (DE) .......................................... 298 12 800 U

(51) Int. Cl.⁷ .............................. B60R 21/20; B60R 21/26
(52) U.S. Cl. ........................ 280/728.2; 280/732; 280/740
(58) Field of Search ................................ 280/728.2, 732, 280/740, 728.1, 730.1, 743.1

(56) References Cited

U.S. PATENT DOCUMENTS

| | | | |
|---|---|---|---|
| 5,234,227 | * | 8/1993 | Webber .................................. 280/732 |
| 5,261,692 | * | 11/1993 | Kneip et al. ........................ 280/728.2 |
| 5,308,109 | * | 5/1994 | Igawa .................................. 280/728.2 |
| 5,366,240 | * | 11/1994 | Hanabusa et al. ................ 280/728.2 |
| 5,452,913 | * | 9/1995 | Hansen et al. ........................ 280/732 |
| 5,482,313 | * | 1/1996 | Ikeya et al. ........................ 280/728.2 |
| 5,613,704 | | 3/1997 | White Jr. et al. . |
| 5,647,608 | * | 7/1997 | Damman et al. ................. 280/728.2 |
| 5,947,510 | * | 9/1999 | Athon et al. ........................ 280/728.2 |
| 6,047,986 | * | 4/2000 | Ishikawa et al. ..................... 280/740 |

FOREIGN PATENT DOCUMENTS

| | | |
|---|---|---|
| 4137691 | 11/1992 | (DE) . |
| 4217956 | 1/1993 | (DE) . |
| 4309925 | 10/1993 | (DE) . |
| 4414743 | 11/1994 | (DE) . |
| 19514325 | 10/1995 | (DE) . |
| 19514336 | 10/1995 | (DE) . |
| 29612777 | 1/1997 | (DE) . |
| 19732022 | 2/1998 | (DE) . |
| 29716535 | 2/1998 | (DE) . |
| 19645373 | 4/1998 | (DE) . |
| 19703470 | 4/1998 | (DE) . |
| 19751991 | 5/1998 | (DE) . |

* cited by examiner

*Primary Examiner*—Peter C. English
(74) *Attorney, Agent, or Firm*—Tarolli, Sundheim, Covell, Tummino & Szabo L.L.P.

(57) ABSTRACT

A gas bag module for a vehicle occupant restraint system, comprises a gas bag having a folded part, a gas generator for generating compressed air, a pressure chamber housing, in which the gas generator is arranged, which surrounds the gas generator and in which the generated compressed gas spreads, and an ejection channel in which the folded part of the gas bag is arranged and which predefines an unfolding direction upon inflation of the gas bag. The ejection channel is constructed as a box-shaped separate part with a flange. The pressure chamber housing has a counter flange. The ejection channel is attached to the housing by attaching the flange to the counter flange. The gas bag is clamped immediately between the flange and the counter flange. Further the invention relates to a method for assembling parts of an air bag module to each other for shipping purposes and for installation into a vehicle.

10 Claims, 4 Drawing Sheets

GAS BAG MODULE AND METHOD OF ASSEMBLY THEREOF

TECHNICAL FIELD

The invention relates to a gas bag module for a vehicle occupant restraint system.

BACKGROUND OF THE INVENTION

In the gas bag modules known hitherto, numerous housing parts are provided, namely the pressure chamber housing, the ejection channel and between the two a heat shield sheet and also a fastening sheet inserted into the gas bag, by means of which the gas bag is fastened to the pressure chamber housing in the region of the so-called inflation orifice.

BRIEF SUMMARY OF THE INVENTION

The invention provides a more simply constructed gas bag module which consists of fewer parts, without this being to the detriment of the optimum fastening of the gas bag to the module.

The gas bag module according to the present invention comprises a gas bag having a folded part, a gas generator for generating compressed air, a pressure chamber housing, in which the gas generator is arranged, which surrounds the gas generator and in which the generated compressed gas spreads, and an ejection channel in which the folded part of the gas bag is arranged and which predefines an unfolding direction upon inflation of the gas bag. The ejection channel is constructed as a box-shaped separate part with a flange. The pressure chamber housing has a counter flange. The ejection channel is attached to the housing by attaching the flange to the counter flange. The gas bag is clamped immediately between the flange and the counter flange.

The ejection channel widens in a funnel shape towards its unfolding opening, which facilitates the unfolding process.

The number of parts can be further reduced when the ejection channel is bolted or screwed to the pressure chamber housing and the bolts or screws provided for this serve simultaneously for fastening the module to the vehicle. In the gas bag modules known hitherto, separate bolts or screws were used for fastening the module to the vehicle and for fastening the parts of the module.

In addition, provision is made according to a further development that the gas bag extends from inside the ejection channel, between flange and counter flange to outside the pressure chamber housing and extends around the pressure chamber housing. In this region, the gas bag can be constructed in a loop shape. This development provides the advantage that the part of the gas bag extending around the pressure chamber housing can also receive a traction on unfolding, and the gas bag does not have to be held solely by means of the clamping force between the flange and counter flange.

If a heat shield is provided, which is formed in one piece on the pressure chamber housing, preferably by bending at least one lug on the pressure chamber housing, a further part can be saved.

The invention further relates to a cheap method for preassembling an air bag module for shipping purposes and for installation of the module into a vehicle. The module comprises a gas bag having a folded part, a gas generator for generating compressed air, a pressure chamber housing, in which the gas generator is arranged, which surrounds the gas generator and in which the generated compressed gas spreads, and an ejection channel in which the folded part of the gas bag is arranged and which predefines an unfolding direction upon inflation of the gas bag. The ejection channel is constructed as a box-shaped separate part with a flange. The pressure chamber housing has a counter flange and the gas bag is clamped immediately between the flange and the counter flange. The ejection channel and the pressure chamber housing are affixed to each other for shipping purposes only by an adhesive strip which at least partially closes the unfolding opening of the ejection channel and extends to or around the pressure chamber housing to define a preassembled unit. The preassembled unit is installed into the vehicle by at least one of a screw and bolt connection by which the flange and the counter flange are attached to each other and by which, simultaneously, the preassembled unit is attached to the vehicle. By this arrangement a cheap way for providing a preliminary attachment of the pressure chamber and the ejection channel is provided. Further, by using the same screw or bolt connection for fixing the pressure chamber to the ejection channel and for fixing the module to the vehicle the number of parts can be reduced.

DETAILED DESCRIPTION OF A PREFERRED EMBODIMENT

Figure 1:
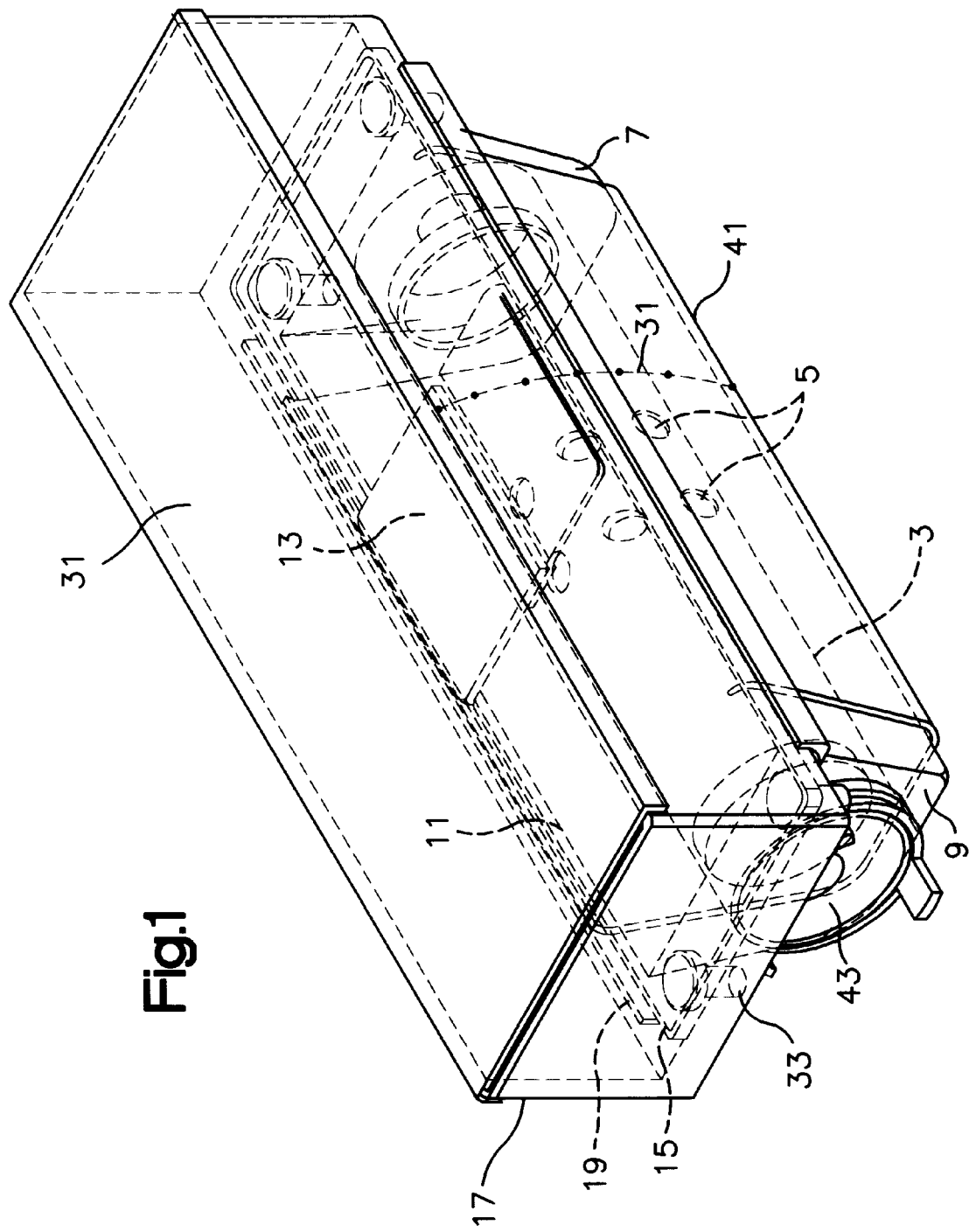
FIG. 1 shows a perspective view of an embodiment of the gas bag module according to the invention.
Figure 2:
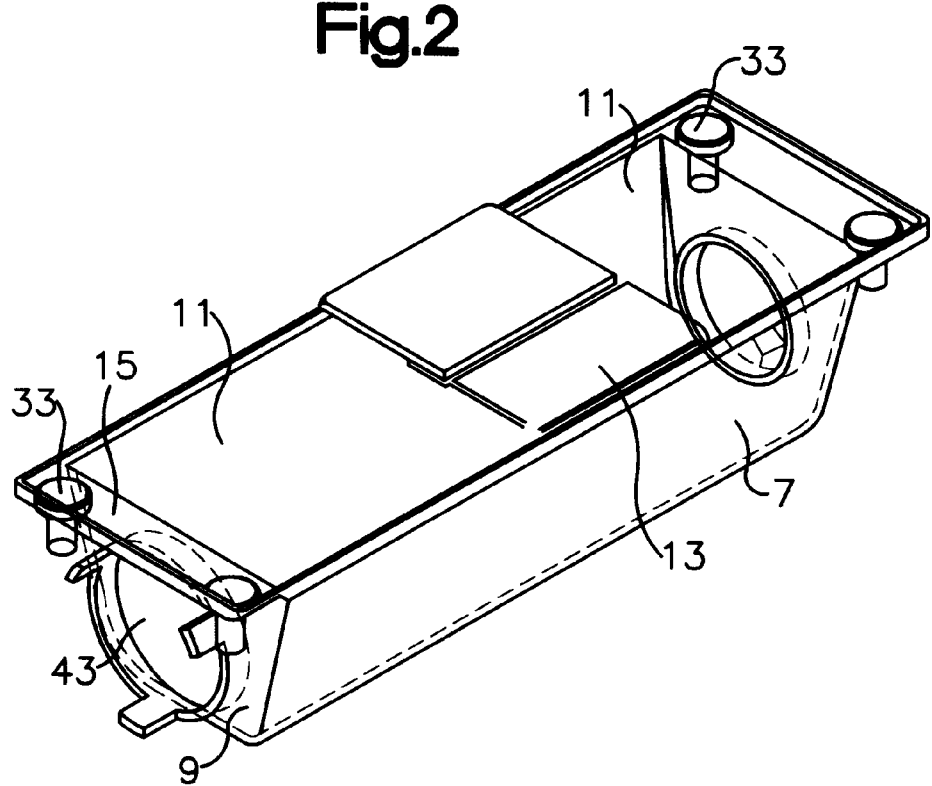
FIG. 2 shows a perspective view only of the pressure chamber housing according to FIG. 1.

In FIG. 1 the gas bag module for a vehicle occupant restraint system according to the invention is shown. It comprises a generally tubular gas generator 3, shown with broken lines, which has outflow openings 5 distributed on the periphery only in the region of the center of the gas generator. The gas generator is arranged in a trough-shaped pressure chamber housing 7 and is fastened by its end faces to the end faces 9 of the pressure chamber housing 7. The pressure chamber housing 7 has on its upper face an outlet opening 11 for generated gas, which opening 11 is covered by a heat shield 13 in the region of the outflow openings 5, viewed in radial direction with respect to the axis Of the gas generator 3. The heat shield 13 is formed by bending two opposing lugs on the pressure chamber housing 7. Owing to the heat shield 13, as will become clearer later, a direct flowing against the gas bag by hot gas is ruled out. The outlet opening 11 is surrounded by a flange 15 arranged in one piece on the pressure chamber housing 7. A box-shaped ejection channel 17 is placed onto this flange 15, which channel 17 likewise has a flange 19 corresponding to the flange 15. The ejection channel 17 serves to accommodate a folded gas bag placed therein, which is illustrated as a block in FIG. 3 to simplify the illustration and is given reference number 21. Furthermore, the ejection channel 17, which widens slightly towards its upper opening which is designated as unfolding opening 23, serves to establish the unfolding direction at the start of the unfolding process. When the gas bag is in the folded condition, the unfolding opening 23 is covered by an adhesive strip 31 having a large area, so that the gas bag 21 can not emerge from the ejection channel 17 during shipping. Thus, the gas bag module defines a preassembled unit. The adhesive strip can also be guided around the entire gas bag module, however, so that through it the ejection channel 17 is connected with the pressure chamber housing 7, in particular for shipping. A dot-dash line shown in FIG. 1 is a schematic representation of the adhesive strip connecting the ejection channel to the pressure chamber housing and is not intended to represent any specific width of the strip. In the installed state of the module, the ejection channel 17 and the pressure chamber housing 7 are in fact fastened to each other in a load-transmitting manner by means of several bolts or screws, both identified by reference sign 33, the bolts or screws being provided in the region of the flanges 15 and 19. The gas bag has an inflation orifice, i.e. an opening which is surrounded and defined by a rim which is clamped directly between the flanges 15 and 19, i.e. without an intermediate piece. A loop 41 provided on the gas bag 21 extends outwards from the rim surrounding the inlet and surrounds the pressure chamber housing 7, and extends on the side of the opposite flange into the gas bag module between the flanges 15 and 19 again. The loop 41 serves to secure the gas bag during the unfolding process, in which a high traction is exerted onto the fastening of the gas bag in the gas bag module. As the loop 41 does not cover the end faces 9 of the pressure chamber housing 7, the gas generator 3 can be inserted into the pressure chamber housing via an opening 43 in an end face after the gas bag is installed and after the connecting of the ejection channel and pressure chamber housing.

The bolts or screws 33 serve not only for arresting the pressure chamber housing 7 and the ejection channel 17 in the state of the module, but also at the same time for fastening the gas bag module to the vehicle. A dashed line in FIG. 3 around the bolt or screw 33 is a schematic representation of a vehicle part. For this, the bolts or screws 33 can be arrested firmly on the ejection channel, for example. They are inserted through openings in the gas bag and in the flange 15, which forms the counter flange. The gas bag module is then bolted to the vehicle by means of nuts which are not shown.

Figure 3:
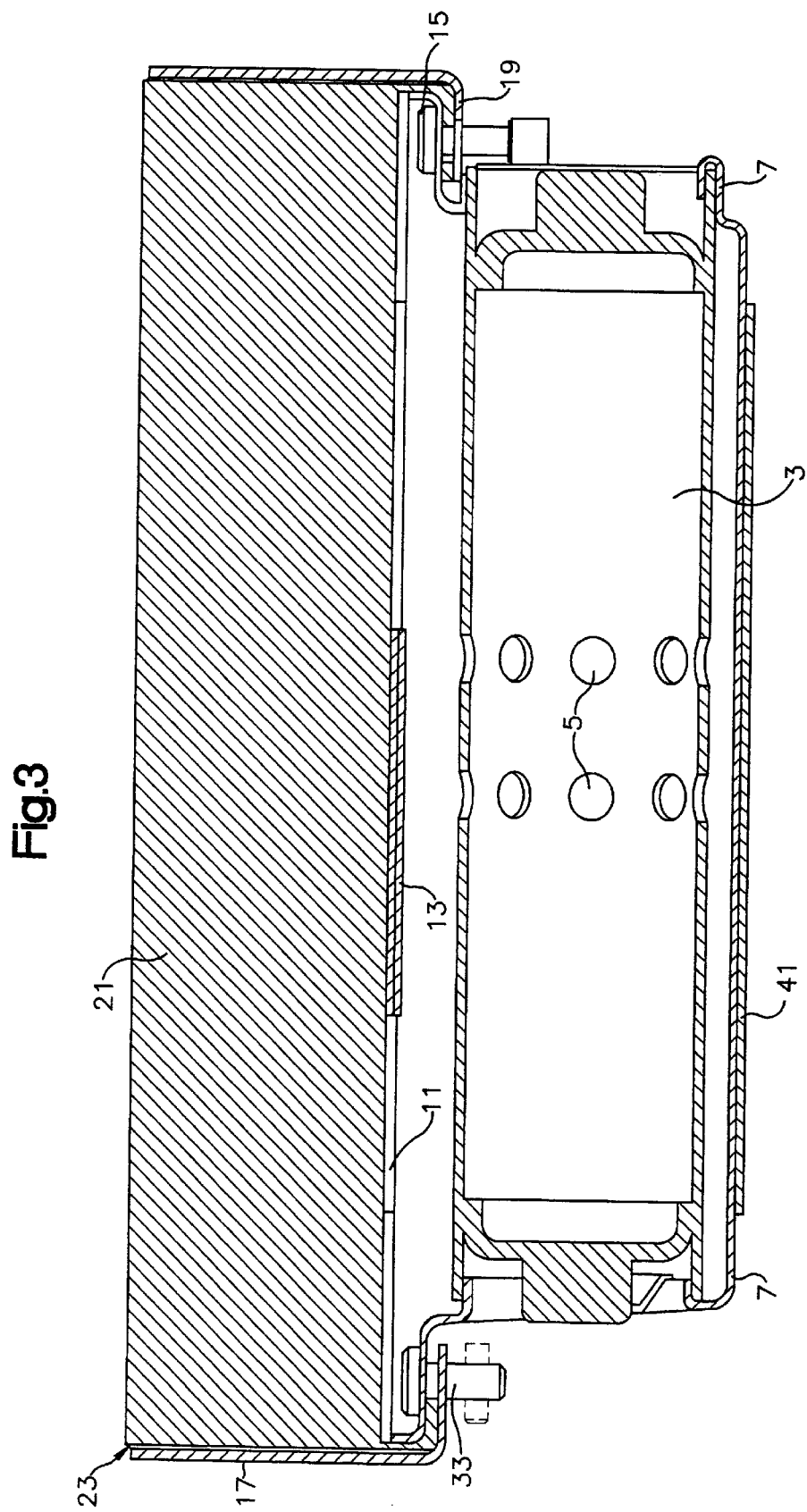
FIG. 3 shows a longitudinal sectional view through the gas bag module according to FIG. 1
Figure 4:
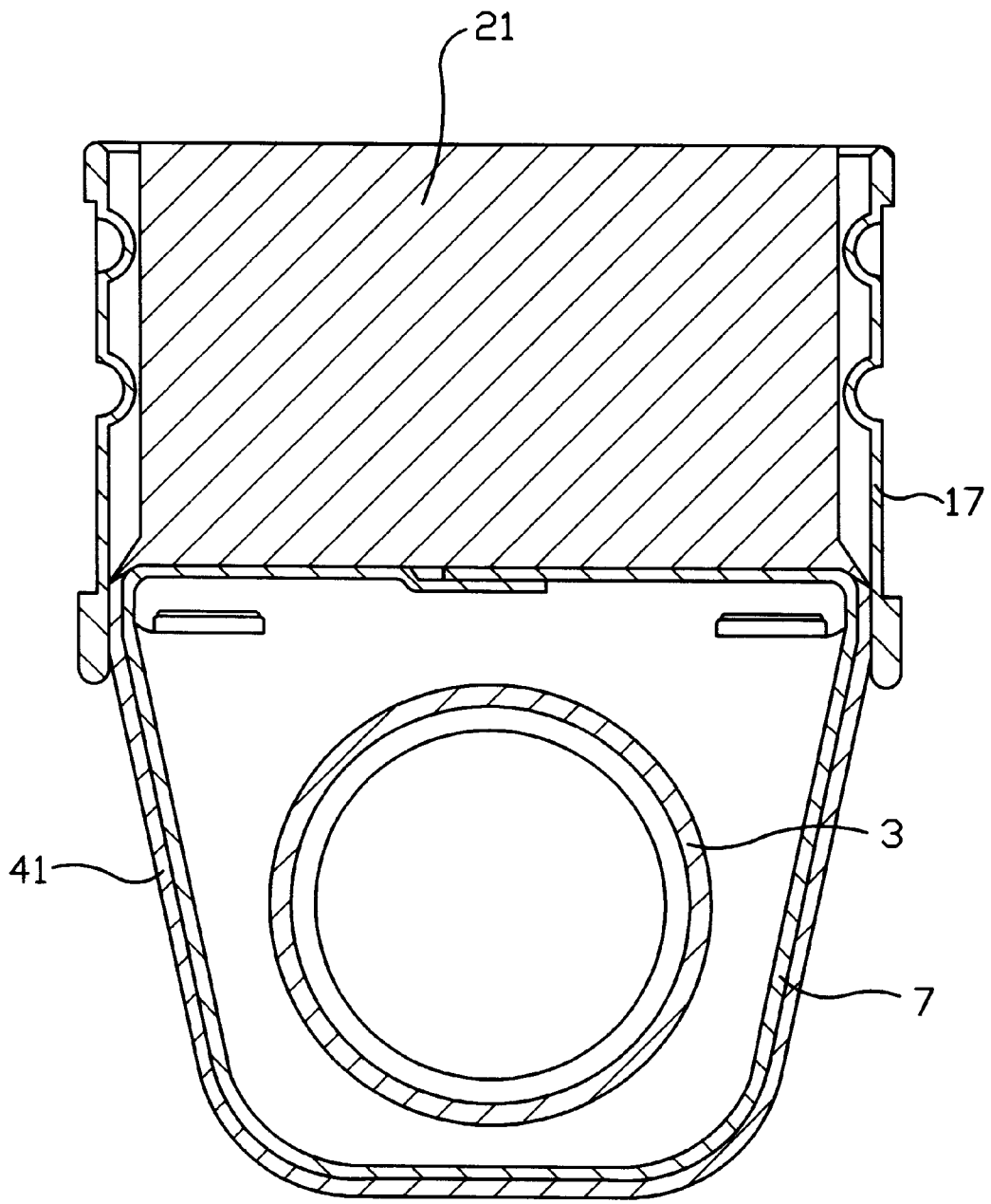
FIG. 4 shows a cross-sectional view through the gas bag module according to FIG. 1.

After the igniting of the gas generator, the gas spreads in the pressure chamber housing. After emerging from the gas generator 3, the gas partially strikes onto the heat shield 13, so that a direct flowing against the gas bag fabric is prevented. The gas leaves the pressure chamber housing aria the outlet opening 11 and unfolds the gas bag. The unfolding direction at the start of the unfolding process is predefined by the ejection channel 17. As can be seen in FIG. 3, the flange 19 not necessarily has to come to lie on the flange 15, rather it can also happen that the flange 19 is arranged under the flange 15.

What is claimed is:

1. A gas bag module for a vehicle occupant restraint system, with
    a gas bag having a folded part,
    a gas generator for generating compressed gas,
    a pressure chamber housing, in which said gas generator is arranged, which surrounds said gas generator and in which said generated compressed gas spreads,
    an ejection channel in which said folded part of said gas bag is arranged and which predefines an unfolding direction upon inflation of said gas bag,
    said ejection channel being constructed as a box-shaped separate part with a flange,
    said pressure chamber housing having a counter flange,
    said ejection channel being attached to said housing by attaching said flange to said counter flange, and
    said gas bag being clamped immediately between said flange and said counter flange,
    said ejection channel has an unfolding opening via which said gas bag emerges, and
    an adhesive strip which at least partially closes said unfolding opening of said ejection channel,
    said adhesive strip connecting said ejection channel and said pressure chamber housing with each other for shipping of said gas bag module.

2. Method for preassembling an air bag module for shipping purposes and for installation of said module into a vehicle, said module comprising:
    a gas bag having a folded part,
    a gas generator for generating compressed gas,
    a pressure chamber housing, in which said gas generator is arranged, which surrounds said gas generator and in which said generated compressed gas spreads, and
    an ejection channel in which said folded part of said gas bag is arranged and which predefines an unfolding direction upon inflation of said gas bag,
    said ejection channel being constructed as a box-shaped separate part with a flange,
    said pressure chamber housing having a counter flange, and
    said gas bag being clamped directly between said flange and said counter flange, said method comprising
    affixing said ejection channel and said pressure chamber housing to each other for shipping purposes by only an adhesive strip which at least partially closes an unfolding opening of said ejection channel and extends to said pressure chamber housing to define a preassembled unit, and
    installing said preassembled unit into said vehicle by at least one of a screw and bolt connection by which said flange and said counter flange are attached to each other and by which, simultaneously, said preassembled unit is attached to said vehicle.

3. A gas bag module for a vehicle occupant restraint system, with
    a gas bag having a folded part,
    a gas generator for generating compressed gas,
    a pressure chamber housing, in which said gas generator is arranged, which surrounds said gas generator and in which said generated compressed gas spreads,
    an ejection channel in which said folded part of said gas bag is arranged and which predefines an unfolding direction upon inflation of said gas bag,
    said ejection channel being constructed as a box-shaped separate part with a flange,
    said pressure chamber housing having a counter flange,
    said ejection channel being attached to said housing by attaching said flange to said counter flange,
    said gas bag being clamped immediately between said flange and said counter flange,
    said ejection channel being fixed to said pressure chamber housing by one of bolts and screws which serve simultaneously for fastening said gas bag module to a vehicle.

4. The gas bag module according to claim 3, wherein said gas bag extends from inside said ejection channel between said flange and said counter flange to outside said pressure chamber housing and includes a part which extends around said pressure chamber housing.

5. The gas bag module according to claim 4, wherein said part of said gas bag which extends around said pressure chamber housing is constructed in a loop shape and is open in the region of at least one end face of said pressure chamber housing in order to permit an insertion of said gas generator via a corresponding opening in said end face of said pressure chamber housing.

6. The gas bag module according to claim 3, wherein said pressure chamber housing has an outlet opening which is partially closed by a heat shield.

7. The gas bag module according to claim 6, wherein said heat shield is formed in one piece with said pressure chamber housing.

8. The gas bag module according to claim 6 wherein said heat shield is formed by at least one bent lug of said pressure chamber housing.

9. The gas bag module according to claim 6, wherein said gas generator has outflow openings only in the region of said heat shield, so that a direst flowing against said gas bag by hot gas is prevented.

10. The gas bag module according to claim 3, wherein said ejection channel has an unfolding opening via which said gas bag emerges, and wherein an adhesive strip is provided which at least partially closes said unfolding opening of said ejection channel.

\* \* \* \* \*